Reissued Feb. 12, 1952

Re. 23,462

UNITED STATES PATENT OFFICE 23,462

ASPHALT EMULSION FOR TREATMENT OF COAL AND METHOD OF PREPARING THE SAME

Charles R. Rosencranse, Pittsburg, Kans., assignor of fifty per cent to Joe F. Klaner, Jr., Pittsburg, Kans.

No Drawing. Original No. 2,431,891, dated December 2, 1947, Serial No. 527,482, March 21, 1944. Application for reissue August 17, 1950, Serial No. 180,091

6 Claims. (Cl. 106—277)

Matter enclosed in heavy brackets [ ] appears in the original patent but forms no part of this reissue specification; matter printed in italics indicates the additions made by reissue.

The invention relates to a colloidal suspension of asphalt which when sprayed on coal forms a permanent coating rendering the coal substantially dust-proof and impervious to moisture and oxidation, the present subject matter involving improvement over the subject matter of my copending application Serial No. 367,282, filed November 26, 1940, *now abandoned*, for Fuel and process of producing the same, of which the present application is a continuation-in-part.

An important object of the invention is to provide a substance of the character indicated which does not require to be heated for application to the coal, and which while forming a hard, dry, and permanent coating on the coal, does not cause the coal particles to objectionably adhere together.

Another important object of the invention is to provide an asphaltic coating for coal of the character indicated, which although of microscopic thinness, positively seals the coal permanently against weathering and slacking during ordinary handling and storage of the coal.

Another important object of the invention is to provide a coating for coal of the character described which can be removed only by combustion or immersion of the coal in a suitable solvent other than water, and which as a result renders the coal clean to handle and non-soiling with respect to other objects or materials with which the coated coal may come into contact.

By "coal" as referred to herein, is meant bituminous, semi-bituminous, anthracite, semi-anthracite, or the so-called lignite coals, and others comprehended by these terms. The examples given hereinbelow as embodiments of the invention will be understood to be exemplary only and as not restricting the invention except as defined in the appended claims.

In preparing the desired colloidal suspension of asphalt which is to be sprayed on the coal for the purposes set forth above, it is necessary to use asphalt of low [initial] penetration *of about 2.6 to 3.0 mm.* and high melting point of from [140° to 180° F.] *210° to 260° F.*, having certain characteristics. However, all such asphalts are not suitable. Some, for instance, do not exhibit the required ductility and adhesiveness to the coal, as judged by the coating they form on the coal, but are unduly brittle and chip or flake off the coal. Others, although providing sufficient ductility, produce excessive tackiness which causes the coal particles to stick together undesirably. For this reason processing of the asphalt as disclosed hereinbelow is essential to provide asphalt in the required form.

The source of the asphalt used is not critical and asphalt derived by the distillation of crude oil and having an initial or original penetration range of [80 to 100 or] 8 to 10 mm. and ductility between 150 to 180 *cm.* [or 15 to 18 mm.] has been found suitable and efficient. *The method of determining this ductility is standard in the industry and bears the designation, D-113-44 by the American Society for Testing Materials and is found on pages 1049-1051 in the "1949 Book of A. S. T. M. Standards," part III, published by American Society for Testing Materials, 1916 Race Street, Philadelphia 3, Pa. The test is made at a temperature of 76.1-77.9° F. with the speed of 5 centimeters per minute.*

*Dimensions of the mold shall be such that, when properly assembled, it will form a briquette having the following dimensions:*

| | *Centimeters* |
|---|---|
| *Total length* | *7.45 to 7.55* |
| *Distance between clips* | *2.97 to 3.03* |
| *Width at mouth of clip* | *1.98 to 2.02* |
| *Width at minimum cross section (halfway between clips)* | *.99 to 1.01* |
| *Thickness throughout* | *.99 to 1.01* |

*For pulling the briquette apart, any apparatus may be used which is so constructed that the specimen will be continually immersed in water. The usual machines available on the market are constructed of stone and permit a total elongation of the specimen of from 100 to 200 cm. The test is carried out in a horizontal machine and the material is buoyed by immersion in the fluid. One such machine capable of carrying out this operation is found in the article "An improved machine for testing ductility of bituminous substances," by Robert R. Thurston and C. E. Cummins appearing on page 286 of the "Industrial and Engineering Chemistry Journal," analytical edition, volume 9, No. 6, 1937.*

In processing the selected asphalt, it is placed in an oxidizing chamber, where it is heated, according to the rapidity of oxidation, to a temperature of from 140° to 180° F., and "blown" with approximately 4000 cubic feet of air per minute, for about eight hours. This reduces the penetration of the asphalt to about 26 to 30 or 2.6 to 3.0 mm. and raises its melting point to about from 210° to 260° Fahrenheit.

The resultant asphalt is then heated in a container to a temperature of about 300° Fahrenheit and run into the intake of a colloid mill simultaneously with an approximately equal amount by volume of the aqueous dispersion which is described below and which has been heated in a separate container to a temperature of about 180° Fahrenheit. The resultant emulsion is discharged into a heat exchanger by which its temperature is rapidly reduced to about 150° Fahrenheit, whence the emulsion is run into storage containers.

The said dispersion consists of the following components in substantially the proportions, by volume, set forth:

| | Per cent |
|---|---|
| Water | 95.04 |
| Resin (a substantially petroleum hydrocarbon insoluble pine wood resin) | 3.00 |
| Bentonite clay | 1.40 |
| Tall oil | .10 |
| Caustic soda | 0.46 |

It is to be noted that the asphalt is heated to 300° Fahrenheit before being run through the colloid mill. This is necessary in order to bring the asphalt to a state of sufficient fluidity to mix with the water component of the above dispersion and subsequently form a colloidal compound, but introduces a problem in view of the fact that the boiling point of water is 212° Fahrenheit. In order to overcome this problem it was found necessary to produce and maintain a constant and critical rate of flow while the combined materials are fed through the colloid mill, which depends upon the size of colloid mill used. In other words, the rate of flow is not in itself critical, but the speed of the mill is, and the speed of the mill is the determining factor of the rate of flow. In using a colloid mill having a normal speed of 10,000 R. P. M. it was found necessary to reduce its speed to substantially 5,000 R. P. M. Otherwise the material obtained was found to be unsuitable for coating coal in accordance with the present invention. Any efficient heat exchanger can be used if the constant rate of flow through the colloidal mill is maintained and the speed of the mill is not permitted to go above about half normal speed or, in the example, given 5,000 R. P. M.

The resultant colloidal suspension of asphalt does not need any special treatment and to be heated to render it usable after a long period of storage, unless it has been stored at a temperature below its freezing temperature of about 32° Fahrenheit, in which event it requires only sufficient application of heat to restore it to a fluid and atomizable or sprayable condition. At 70° Fahrenheit the material has a viscosity of 18, as compared with 10 for water at the same temperature.

The resin component of the above dispersion is identified as a gasoline insoluble resin obtained, for example, from pine wood by extraction of comminuted pine wood by a coal tar hydrocarbon, removal of the mixture of solid resins, extracting such solid resin mixture by a volatile paraffin hydrocarbon to remove rosin from said resin mixture, and covering a paraffin hydrocarbon-insoluble resin substantially free from rosin. Such a resin substance is disclosed and claimed in Patent No. 2,193,026, granted March 12, 1940, to Lucius Coleman Hall.

The "tall oil" component of the above dispersion disclosed in Patent No. 2,305,498 granted December 15, 1942, to Ernest Segessemann, is in general the resinous and fatty by-product obtained chiefly in the production of paper pulp from resin-bearing woods by the so-called sulphate process. In the sulphate process wood is digested with an alkaline liquor containing sodium sulphate, during which process tall oil accumulates in the form of its sodium soap on the surface of the waste liquor.

The coating material of the present invention, requiring no heating at above freezing temperatures, can be sprayed or atomized on the coal, directly from the storage containers, by means of any suitable spraying equipment, including such as is used for spraying other coal coating fluids.

Having described the invention, what is claimed as new is:

1. The method of making a colloidal suspension of asphalt for spraying on coal at atmospheric temperature to form a permanent coating rendering the coal substantially dust-proof and impervious to moisture and oxidation, which consists in taking an asphalt of a type having initially a penetration rating of about 8 to 10 mm. and a ductility rating of about [15 to 18 mm.] *150 to 180 cm.*, and blowing the asphalt at an oxidizing temperature of from 140° to 180° F. in an oxidizing chamber with about 4,000 cubic feet of air per minute for about eight hours to reduce the penetration of the asphalt to about 2.6 to 3.0 mm. and raising its melting point to about from 210° to 260° F., then heating the asphalt in a container to a temperature not over 300° F., then simultaneously running the hot blown asphalt through a colloid mill operating at substantially 5,000 R. P. M., and at a constant rate, together with an aqueous dispersion heated to about 180° F., said dispersion containing by volume substantially 95.04% of water, 3% of a substantially petroleum hydrocarbon insoluble pine wood resin, 1.4% of bentonite, 0.10% of tall oil, and 0.46% of caustic soda, then rapidly reducing the temperature of the resultant emulsion to about 150° F., for storage.

2. Material adapted to be sprayed at atmospheric temperature on coal and forming thereon a hard, dry and permanent coating rendering the coal dust-proof, moisture-proof and oxidation-proof and preventing the same from becoming sticky and adhering to cause large lumps, consisting of a colloidal suspension of asphalt of a type having initially a low penetration and a high melting point after being heated and blown in an oxidizing chamber with approximately 4,000 cubic feet of air per minute for about eight hours and the penetration of the asphalt reduced to about 2.6 to 3.0 mm. and its melting point raised to about from 210° to 260° F., the resultant asphalt heated to a temperature of about 300° F. and simultaneously run through a colloid mill with an approximately equal amount by volume of an aqueous dispersion composed of water 95.04%, a substantially petroleum hydrocarbon insoluble pine wood resin 3.0%, bentonite clay 1.4%, tall oil 0.10% and caustic soda 0.46% at a temperature of about 180° F. and the resultant emulsion rapidly reduced to a temperature of about 150° F.

3. A method of producing a coating composition for coal for application as a spray at atmospheric temperature which consists in running a quantity of colloidal asphalt derived by the distillation of crude oil after having been previously heated in an oxidizing chamber to a temperature of from 140° to 180° F. and blown with approximately 4,000 cubic feet of air per minute for about eight hours to reduce the penetration of the asphalt to about 2.6 to 3.0 mm. and raising its melting point to about 210° to 260° F. and then heated to a temperature of about 300° F., with an equal volume of an aqueous dispersion of the following ingredients in the proportions stated, consisting of water 95.04%, a substantially petroleum hydrocarbon insoluble pine wood resin 3.0%, bentonite clay 1.4%, tall oil 0.10% and caustic soda 0.46% and then discharging the resultant emulsion into a heat exchanger to rapidly reduce the temperature thereof to 150° F.

4. A method of producing a coating composition for coal for application as a spray at atmospheric temperature, which consists in simultaneously running through a colloidal mill operating at substantially 5,000 R. P. M., a hardened colloidal blown asphalt having a penetration of about 2.6 to 3.0 mm. and a melting point of about 210° to 260° and heated in a container to a temperature of about 300° F., with an equal volume of an aqueous dispersion heated to a temperature of about 180° F. and containing by volume 95.04% water, 3.0% of a substantially petroleum hydrocarbon insoluble pine wood resin, 1.4% of bentonite clay, 0.10% of tall oil and 0.46% of caustic soda and subsequently rapidly reducing the temperature of the resultant emulsion to about 150° F.

5. An asphaltic coal coating composition consisting of a colloidal emulsion of blown asphalt of a type characterized before [the] blowing by [low] *high* penetration and [high] *low* melting point and run into the intake of a colloidal mill after being preheated to a temperature of about 300° F., simultaneously with an approximately equal amount by volume of an aqueous dispersion at a temperature of about 180° F. containing water 95.04%, a substantially petroleum hydrocarbon insoluble pine wood resin substantially free from rosin 3.0%, bentonite clay 1.4%, tall oil 0.10%, and caustic soda 0.46% and then rapidly reduced to a temperature of about 150° F.

6. A method of producing an asphaltic coal coating composition consisting in forming a colloidal emulsion of 50% by volume of hot blown asphalt heated to a temperature of about 300° F. and characterized by [initial] low penetration rating and high melting point [to reduce the penetration and raise the melting point] and simultaneously running the same at a constant rate of flow through a colloidal mill at a constant speed of substantially 5,000 R. P. M., with an approximately equal volume of an aqueous dispersion of approximately 50% by volume of the total emulsion consisting of water 47.52%, a substantially petroleum hydrocarbon insoluble pine wood resin 1.5%, bentonite clay 0.70%, tall oil 0.05% and caustic soda 0.23% and then discharging the resultant emulsion into a heat exchanger to reduce its temperature to about 150° F.

CHARLES R. ROSENCRANSE.

REFERENCES CITED

The following references are of record in the file of this patent or the original patent:

UNITED STATES PATENTS

| Number | Name | Date |
|---|---|---|
| 1,734,437 | Kirschbraun | Nov. 5, 1929 |
| 1,807,808 | Symons | June 2, 1931 |
| 1,884,919 | Thompson | Oct. 25, 1932 |
| 2,016,306 | Watts | Oct. 8, 1935 |
| 2,125,753 | Spencer | Aug. 2, 1938 |
| 2,256,886 | Buckley | Sept. 23, 1941 |
| 2,314,242 | Porter | Mar. 16, 1943 |
| 2,340,449 | Barwell | Feb. 1, 1944 |
| 2,350,548 | De Laney | June 6, 1944 |

FOREIGN PATENTS

| Number | Country | Date |
|---|---|---|
| 252,260 | Great Britain | May 25, 1926 |
| 263,307 | Great Britain | Dec. 30, 1926 |
| 471,650 | Great Britain | Sept. 8, 1937 |
| 656,634 | Germany | Feb. 10, 1938 |

OTHER REFERENCES

Smith: "Proc. Am. Soc. Testing Materials," 9, 594–599, 1909.

Thurston: "J. Ind. Eng. Chem. (Anal. Ed.)," 9, 286, 1937.

"Asphalts and Allied Substances," Abraham, 1945, vol. II, pp. 985–993 and 1006–1015.